United States Patent [19]

Gjerde et al.

[11] 4,242,010

[45] Dec. 30, 1980

[54] METHOD AND MEANS FOR PROTECTING A SEA BOTTOM SURFACE AND AN INSTALLATION ON SAME

[75] Inventors: Trygve Gjerde, Jar; Ronald Seim, Myrvoll, both of Norway

[73] Assignees: Ingeniør F. Selmer AS; A/S Høyer-Ellefsen; Ingeniør Thor Furuholmen A/S, all of Oslo, Norway

[21] Appl. No.: 933,357

[22] Filed: Aug. 14, 1978

[30] Foreign Application Priority Data

Aug. 19, 1977 [NO] Norway ................................ 772898
May 3, 1978 [NO] Norway ................................ 781557

[51] Int. Cl.³ .............................................. F16L 57/00
[52] U.S. Cl. ..................................... 405/157; 405/24; 405/172
[58] Field of Search ........................... 405/172, 15–20, 405/154, 172

[56] References Cited

U.S. PATENT DOCUMENTS

| | | | |
|---|---|---|---|
| 763,503 | 6/1904 | McGregor | 405/19 |
| 1,173,880 | 2/1916 | Shearer | 405/16 X |
| 1,359,575 | 11/1920 | Chenoweth | 405/17 |
| 1,834,060 | 12/1931 | Hough | 405/17 |
| 2,570,271 | 10/1951 | Pickett | 405/17 |
| 2,834,186 | 3/1958 | Frerichs et al. | 405/17 |
| 3,517,514 | 6/1970 | Yisser | 405/19 |
| 3,779,027 | 12/1973 | Murphy | 405/172 |
| 3,793,845 | 2/1974 | Keith | 405/172 |

FOREIGN PATENT DOCUMENTS

| | | | |
|---|---|---|---|
| 85181 | 5/1957 | Netherlands | 405/19 |
| 86800 | 11/1957 | Netherlands | 405/19 |
| 1435123 | 5/1976 | United Kingdom | 405/172 |

*Primary Examiner*—Dennis L. Taylor
*Attorney, Agent, or Firm*—Ladas & Parry

[57] ABSTRACT

A means and a method for protecting a sea bottom surface or an installation positioned on same, for instance a pipeline, which means comprises a plurality of pliable concrete plate elements which are flexibly interconnected one after the other and thereby forming a chain-like unit, which chain-like unit is positioned along the sea bottom surface, its flexible characteristics both longitudinally and transversally enabling the unit to adapt itself to transverse and to longitudinal level variations in the course of the laying.

10 Claims, 13 Drawing Figures

METHOD AND MEANS FOR PROTECTING A SEA BOTTOM SURFACE AND AN INSTALLATION ON SAME

INTRODUCTION

The present invention takes aim at protecting a sea bed or one on the sea bed positioned installation. Such installations may be for instance pipelines for the transport of oil or gas from a marine platform structure or to a receiving terminal located on shore or in offshore position. The protection consists of a flexible stratum or layer which is superposed on said installation or positioned on the sea bed in order to prevent erosion of same.

BACKGROUND OF INVENTION

In conjunction with the general increase in the exploitation of hydrocarbons in marine and offshore locations, a similar increase has occurred in the number of installations on the sea bed. Such installations have most often no external protection, a fact which causes risk for damage for instance from fishing gear, and, oppositely, a risk for damaging of fishing gear and also a frequent risk for sapping of the sea bed ground below the marine construction due to erosion. A protection is therefore highly desirable in order to eliminate in a reasonable extent the beforementioned disadvantages.

The present invention is particularly suitable for protection of pipelines positioned on the sea bed. It is usually a prerequisite that such pipelines shall be dug down and be completely covered for instance by the dug up sea bed ground mass. Experience has, however, shown that the degree of down digging and coverage of the pipelines vary very much. Very often such pipelines in fact are positioned completely unprotected on the sea bed or is even in some cases "floating" or suspended above same. One can therefore conclude that it is necessary with a supplementing coverage, at least along those parts of the pipelines which are more or less uncovered.

PRIOR ART

In order to protect pipelines on the sea bed it has been proposed further to down-digging to cover the pipeline with gravel mass or sand bags, in connection with which the covering work is carried out by divers. Such solutions are, however, both time consuming and expensive. Furthermore, sand bags will easily be damaged and/or displaced from correct position having in consequence a possibility for exposition of the pipeline.

It has also been proposed to cover the pipeline with gravel which is dumped down or supplied from a surface vessel. Also such methods have proved both expensive and time consuming. It shall also be remarked that by such methods it has proved difficult to obtain complete coverage of the pipelines. Even if the coverage is satisfactory subsequent to the laying, such masses will frequently be eroded away by streams and waves.

Furthermore, it has been proposed to cover pipelines with prefabricated concrete elements having a substantially reversed U-shaped sectional profile. Each element is being sunk separately down in bridging position over the pipeline and is locked to the preceding located element in a mortice-and-tenon system. Thereby each concrete element is locked against transverse movements relative to the pipeline. Such concrete elements will however form obstructions for fishing gear. Furthermore, a such coverage system requires a certain planing of the sea bed prior to installation of the elements.

It has also been proposed to cover a pipeline with elongated, inter-knitted, flexible mats of synthetic fibres and which are positioned over the pipeline and being kept in place by a number of anchoring means. Implicit in the dependency of uniformly spaced anchoring means the positioning and installation of such mats fall both time consuming and expensive.

Furthermore, it has been proposed to protect the sea bed or even river beds against erosion by means of flexible mats supplied with rigid concrete blocks. Such concrete blocks function then both as ballast and as anchoring means.

THE INVENTION

In accordance with the present invention it is proposed to utilize flexible mats consisting of comparatively thin plates which are interconnected in series in accordance with the "bed bottom principle" into a chain having such length as found necessary for the pipeline in question. As interconnecting means may be used wires of steel or synthetic fibres, or other equivalent interconnecting means. Each of the plates proper has a such specific flexibility that they at least partly configuratively adapt themselves to the pipeline and the sea bed terrain surrounding same. These thin plates consist preferably of thin, flexible concrete and/or pre-stressed reinforced concrete plates. It shall in this connection be mentioned that such thin concrete plates have previously been utilized for the protection of rivers and channels against erosion.

It is stipulated that the plates will get cracks or fracture lines in those cases where the level differences transversely of the pipeline are great, but the reinforcing element and/or a partial pre-stressing will distribute the crack lines and limit the length and size of same. The reinforcements may be protected against corrosion by galvanizing, a covering with synthetic resins or the like.

As outlined, an essential feature of the present invention consists in coupling flexibly together plates preferably made of concrete or pre-stressed concrete in order to provide long mats which by means of suitable surface vessels, such as supply vessels or by means of a so-called "semi-submersible" vessel, is laid out as a continuous mat along that length of the pipeline which is desirable to protect.

In many cases, wherein the sea bed for instance consists of relatively loose material, streams in the water will lead to erosion and displacements of masses such as sand and masses consisting of discrete particles. Such erosion may lead to a washing-out, a removal and a sapping of the foundation and thereby the installations and also to a complete erosion of costal areas, and furthermore to a filling up and obstructions of harbours and harbour inlets, etc.

I such cases it may be necessary to carry out or supplement the above defined mat means with means which reduce the water stream velocity and which furthermore retain sand and ground material which otherwise may be eroded away. It is however also possible to construct the means in accordance with the invention such that it catches particles which are included in a water stream such that it in fact can create and build up sand masses in contrary to the effect that sand masses may be led away. The concrete mats and the flexible mat material can for this purpose be furnished with an uneven or broken surface, with knobs and/or corrugations, which knobs etc. can contribute to a such building up of sand masses by reducing the speed of water streams. Furthermore, when the concrete plates are positioned with a mutual spacing the lesser velocity of the water in the gaps between the plates and below the plates may lead to that sand masses are being built up. A much more effective build up of sand masses can however be obtained by combining the concrete plates with so-called artificial seaweed or even longhaired fibre mats made of any suitable material.

A such broken surface, knobs, etc. and/or fibre mats can be positioned on the top side of the plate, on the bottom side or both. The fibre mats can for instance be arranged along the marginal edge zones of the plates and also outside the plates, and/or they can cover the entire concrete plate and also in a zone laterally outside of each side of the concrete plate.

One of the largest advantages with the mats in accordance with the invention is the ability of the concrete plates, due to their flexibility to be subjected to great deformations without being damaged. These qualities are very important in making the plates so suitable as a protecting coverage for marine pipelines.

A further essential advantage is that the mats due to the spacing and gap between each plate and the interconnecting wires are flexible in longitudinal direction, whereby the mats to a large degree can follow lateral curvatures in the pipeline along the sea bed. The spacing or gaps between each separate plate is also favourable at the laying because streams and waves during this phase thereby have a reduced effect because they receive a smaller attack area. Further, one obtains a better control of the chain or belt of plates/mat units which are being laid out and sunk down. One has also reason to believe that the gaps when the mats are positioned on the sea bottom superposing a pipeline have a favourable influence on the erosion, since the mats probably will function very much as a snow shed. Sand and bottom particles will flow down through the gaps and fill up possible cavities below the mats and around the pipeline.

The mats are formed of at least two in longitudinal direction of the mats extending primary wires and a series of concrete plates. These are arranged transversely of said primary wires and attached to these. Thereby is provided a long and continuous chain of plates and/or smaller mat units which are interconnected and are sunk down onto the sea bed in order to cover the pipeline subsequently as the surface vessel is moving along the path of the pipeline.

The plates may be attached to the primary wires at the two ends of the plates. It shall however be remarked that said primary wires not necessarily are coupled to the plates at their ends. It may for instance be feasible to utilize two or more couples of primary wires for the sinking and guiding operation of the plates/mat units. The plates/mat units can in such case be attached to these wires at two or more points.

In a particularly preferred embodiment the plates are positioned in the mat with a certain mutual spacing. Thereby the mats can form lateral curves in longitudinal direction. The plates are preferably locked to the primary wire. It shall however be remarked that the plate alternatively only may be locked against displacement in longitudinal direction of the plate, the plates being kept at a distance from each other by means of spacers interposed between the plates. The spacers can either be located on the primary wires or they can be provided in the shape of knobs protruding from one or both of oppositely located longitudinal edges of the plates. Such spacers should only partly bridge the spacing between the plates in order to maintain the lateral flexibility of the mat unit. For this purpose the spacers could be made in elastic material such as rubber.

The distance between the plates can if desired be varied. By varying the mutual spacing between the plates the stiffness of the mat, particularly during the laying and sinking operation can be varied. Furthermore, the number of attachment points for each primary wire on each plate in the mat can be varied, in dependence upon the size of each plate and the desired stiffness properties of the mat.

In a further embodiment the mat is composed of smaller mat units consisting for instance of eight plates which in advance are being interconnected for instance by means of two or more synthetic fibre bands, wires or the like, hereinafter named "secondary wires". One solution in this connection is that the beforementioned fibre mats or artificial sea weed mats function as secondary wires. In a such embodiment the smaller mat units are prefabricated or made in advance, either on the shore or aboard said vessel, in conjunction with the laying operation. The secondary wires should have a strength able to sustain the total weight of the mat units. Said mat units are designed to be assembled with said primary wires during the laying operation.

Said fibre mat or mats and/or the attachment means for the primary wires etc., may be attached by shooting same firmly onto the flexible plates, or the said means can be attached in another suitable fashion.

Each plate in the mat can be given any suitable size in regard its length and width without deviating from the object of the invention. Furthermore, the plates may be given any suitable transverse sectional configuration in order to be able to vary the stiffness pertaining to each separate plate.

In the following two preferred methods for laying out said protecting mats shall be described. The first method is designed to be used in connection with a semi-submersible vessel and the second method is designed for being used in connection with a regular supply ship.

In the laying out of the mat is used a suitable surface vessel such as for instance a supply ship or a semi-submersible vessel, equipped for laying out such protecting mats. The mats are composed either of prefabricated separate plates or of prefabricated relatively small mat units in that the separate plates and/or mat units are positioned with the plates pointing transversely of at least two primary wires and are being attached to same. Further plates/mat sections or units are attached to the primary wires subsequent to that the same are being sunk down onto the sea bed in bridging position across the pipeline. The surface vessel is moved simultaneously and in synchronized fashion with said laying operation. The wires are preferably feeded from cable drums positioned on the deck of the vessel. It shall be remarked that at the beginning of the laying out the primary wires are preferably anchored to the sea bottom such that the wires subsequently are being held in suitable tight fashion. Subsequently as the pipeline is being covered and the surface vessel is moved along same, the separate plates or plate/mat units are preferably attached concurrently and simultaneously as corresponding lengths of wires are supplied from the wire drums. The plates and/or mat units are preferably attached to the primary wires by a clamping action. This operation can for instance be accomplished by means of suitable and particularly developed locking means. In cases where each of the primary wires in fact consists of two coupled wires, one wire on each side of each plate, the wires in each couple on each lateral side of the plates and mat units may be clamped together with wire clamps or the like.

A semi-submersible vessel due to its small movements in the sea and its relatively large deck space, preferable as laying vessel. It shall however be remarked that also other types of surface vessels can be utilized in connection with the laying operation. In relatively shallow waters, for instance having a depth not exceeding about 40 meters, it is also possible to utilize a suitable supply ship, particularly if the laying distance is comparatively short.

By laying from a supply ship, is utilized preferably prefabricated mat units, for instance comprising eight plates interconnected by means of secondary wires. For positioning of the mat units on the primary wires the supply ship is at the stern equipped with a suitable gantry crane. This has preferably a free lifting-height not exceeding the length of each prefabricated mat unit. The gantry crane is furthermore designed for maximum luft corresponding to the maximum permitted load above the stern end of the ship. The crane should have both a primary and a secondary lifting system. The secondary lifting system is used for positioning of the plate/mat units in desired position relative to the primary wires, while the primary lifting and lowering system is designed to keep it out from the surface vessel and the part of the mats being suspended in direction towards the bottom, and in order to receive the other tension loads which allies. Det first mat unit is lifted clear off the deck by means of the secondary lifting system of the gantric crane and is positioned on to and is attached to the primary wires. The mat is thereafter sunk down into the water. When the top of the mat has arrived into level with the stern of the supply ship, the sinking operation is abrupted and the next mat unit is lifted up by means of the secondary lifting system and is position in correct position on the primary wires and in correct position relative to the preceding located mat unit. The mat unit is thereafter mounted. The secondary lifting unit is thereafter released, the mat is being sunk down simultaneously as a new mat unit is lifted and is being brought into correct position. The mat units are thus connected together into a such long chain as is found necessary subsequent as to the sinking down and laying is taking place. Each mat unit is preferably attached to the primary wires independent of the forwardly or precedingly mounted mat units. The primary wire or wires are designed to carry the full weight of both those in the sea and above the sea suspended mat sections. It shall be pointed out that, in a mat which is consisting of a number of smaller mat units, so are these preferably interconnected in such way that each plate in the mat unit, can carry its own weight and the secondary wires in each mat unit is carrying the load of the plates in each particular mat unit.

If a "semi-submersible" vessel is used in connection with the laying of the mats, the gantric crane should be positioned in the center of the platform since the movement of the platform is here the smallest.

On a "semi-submersible" platform the laying equipment can be positioned on a feeding table and also rollers can be utilized. The surface vessel is brought and kept into position by means of a combination of own machinery, vinches, anchors and the like. Suitable electronic and optical navigation equipment is used in order to define the position of the vessel and in order to guide same along the pipe line. Further it can be feasible to utilize separate guiding cables at the pipe-line such that a fine adjustment of the laying laterally and above the pipe-line can be carried out. As an alternative can here be necessary to use a guiding sledge along or above the pipe-line as an auxiliary means to guide the mat into correct position.

If the assembling and laying operation must be abrupted, for instance due to bad whether or in awaitance of more mat units or plates, the entire ready made produced mat is being sunk down onto the sea bed and is marked with bouys. When the covering operation anew shall be put into operation, one firstly regains the wire. These are being joined to the wires on the drums, whereafter the next mat units/plate can be positioned in correct position on the primary wires and are being attached. Then the last mat unit is attached to the primary wires, same are fastened to the stern end of the surface vessel and are thereafter cut free from the drums. The wire ends are thereafter attached to a release mechanism, whereafter the last part of the mats are being sent down on to the sea bed, are being anchored to same and are released from the surface vessel.

In accordance with the invention the mat units/plates are prefabricated on shore and/or in offshore position aboard the surface vessel, in dependence upon the deck space on same. It shall furthermore be pointed out that the surface vessel can at its stern be equipped with a ramp or stinger corresponding to the types utilized when laying pipe-lines.

A laying vessel of the type semi-submersible, designed to carry out drilling operations, is usually provided with a open zone in the vicinity of the center of the deck. This opening is particularly suitable for the lowering down of said plates/mat units. In a such laying fashion it is preferred to utilize a horizontal feeding table including rollers, whereon the mounting of the plates/mat units on to the primary wires can be carried out with the primary wires extending horizontally.

In the following the mats and a proposed method for the laying of same shall be described further with reference to the accompanying drawings wherein.

Figure 1:
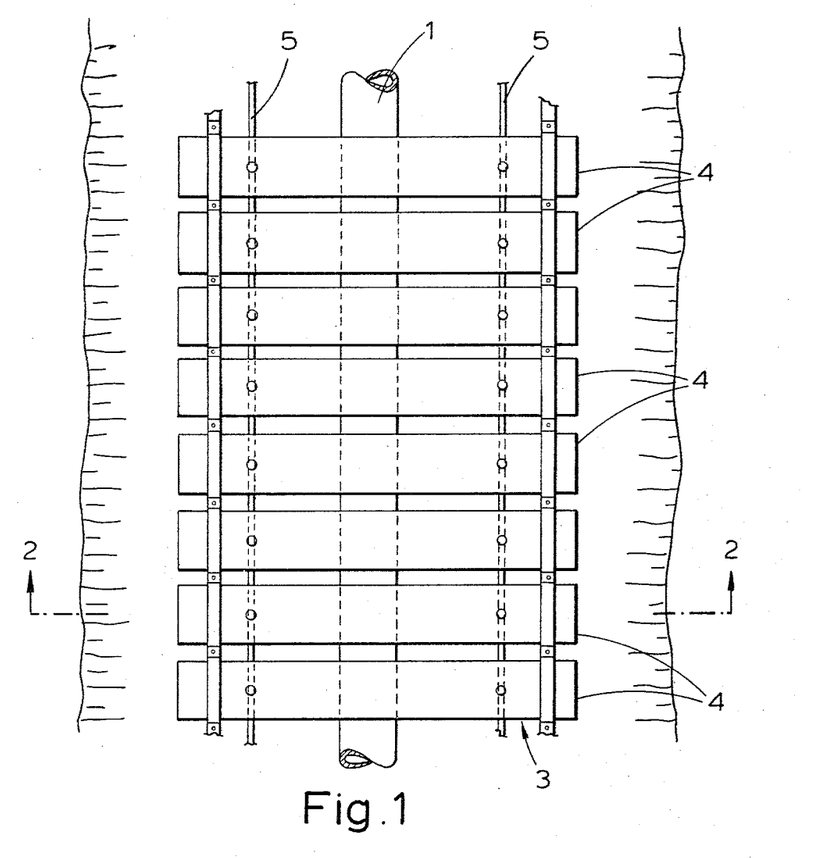
FIG. 1 is schematically showing a pipeline on the sea bed, covered with mats in accordance with the present invention.
Figure 2:
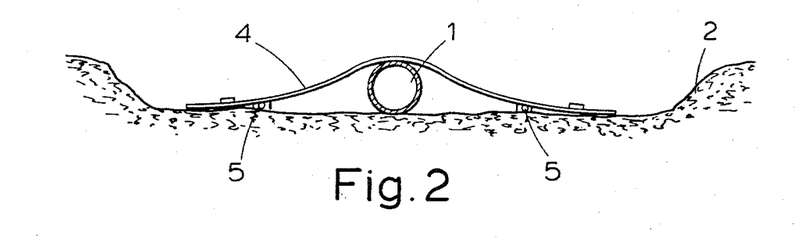
FIG. 2 is schematically showing a sectional view through the pipe line and the mats, taken along the plane 2—2 in FIG. 1.

FIG. 1 is schematically showing a pipeline 1 in position on a sea-bed 2. The pipeline is covered with mats 3 in accordance with the present invention. As shown, the mats 3 are composed of plates 4, which plates are interconnected in accordance with the "bed-bottom-principle" by means of primary wires 5. The shown mat consists of a series of prefabricated mat units 6 which shall be described in detail later. The plates 4 consist of preferably thin, flexible concrete and/or prestressed concrete plates. The plates are so flexible that they adapt themselves, at least partly, in accordance to the configuration of the pipeline 1 and the surrounding terrain. It is assumed that the plates will get cracklines in the cases where the level variations transversally are comparatively great, but the reinforcement and/or partial prestressing will distribute the cracks and limit the extension of such cracklines. The reinforcing may be protected against corrosion by galvanizing, plastic covering or the like. A suitable concrete/prestressed concrete plate may for instance be given a length of 8 meters, a width of 1.2 meter and a thickness of 4 cms. The distance between each plate may for instance be approx. 15 cms. It shall however, be pointed out that the above mentioned dimensions are in no way indicative as a restriction of the scope of the present invention. The weight of one single mat, composed of plates having such dimensions, will be about 100 kgs/m$^2$. If one utilizes mat units for instance consisting of eight such plates, and having a distance between the mats, they will attain a length of about 10 meters. The total weight of a such mat will be about 8 tons.

Figure 3:
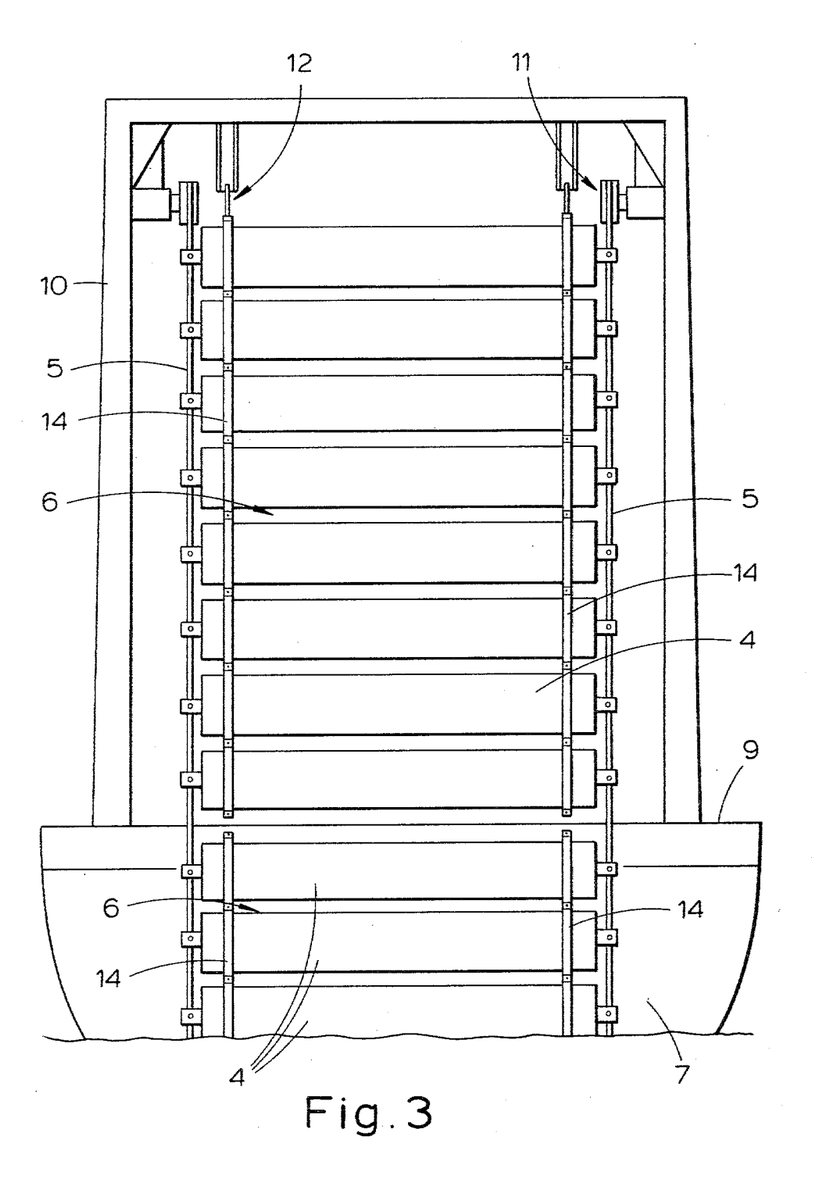
FIG. 3 is schematically showing a vertical section viewed from the rear of the lifting- and hoisting means mounted at the stern on a supply ship, wherein the mat units are mounted in position, ready for the setting and laying.
Figure 5:
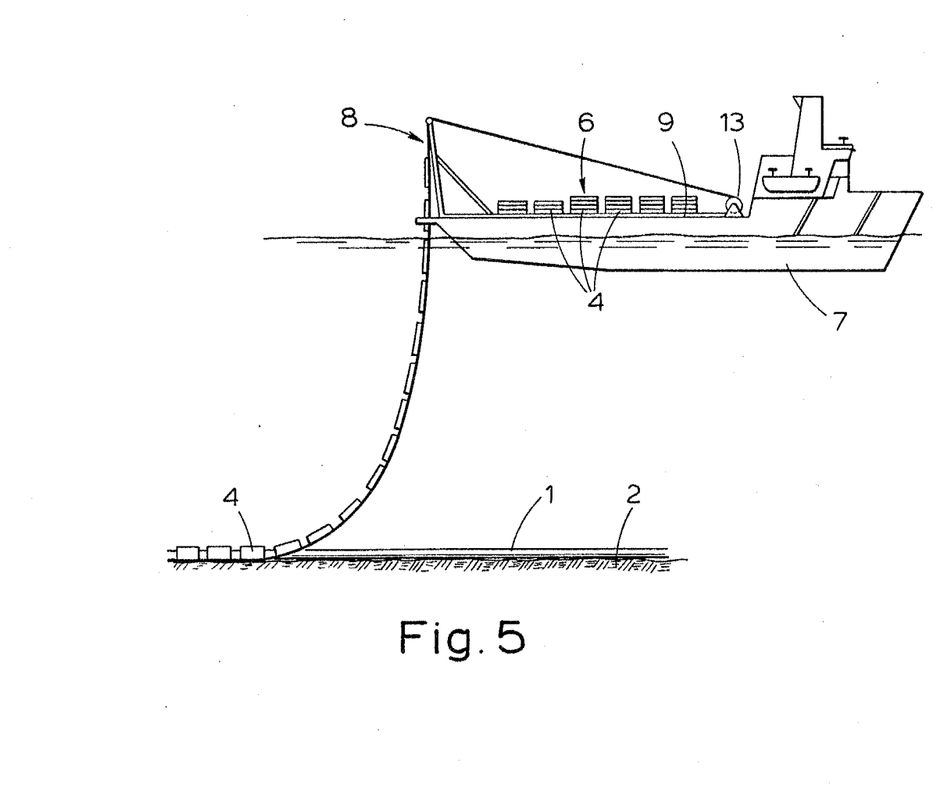
FIG. 5 is schematically showing a lateral view of a supply ship carrying out laying of a mat in accordance with the present invention.
Figure 6:
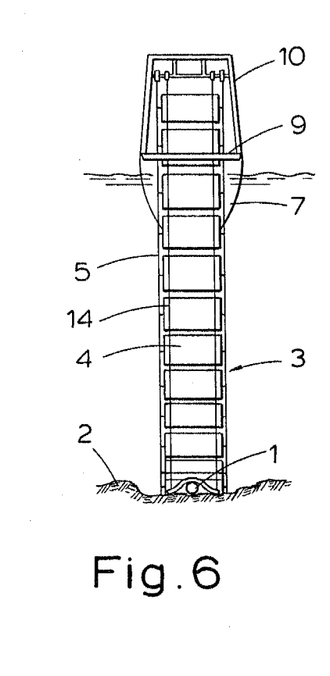
FIG. 6 is schematically showing the supply ship shown in FIG. 5, viewed from astern.

As previously mentioned it is in accordance with the present invention visualized to utilize flexible mats consisting of thin plates which are interconnected in accordance with the "bed-bottom-principle" into a such long chain which will be necessary for said pipeline. As intercoupling means are utilized wires or cables of steel or synthetic fibre, or other intercoupling means. In the following shall be described a preferred laying method from a supply ship which are further described with reference to FIGS. 3, 5, 6 and 7. The Figures are showing a supply ship 7 with all necessary setting equipment 8 viewed from astern. The mat 3 is composed of prefabricated, smaller mat units 7. These are preferably stacked on the deck 9 of the supply ship. The setting-/laying equipment consists of a travelling gantry crane 10. This has preferably a lifting height capacity which exceeds the length of each prefabricated mat unit. By dimensions as previously mentioned, said gantry crane should preferably have a free lifting height of about 12 meters. The gantry crane is furthermore designed for having a maximum lifting load corresponding to the maximum permitted load of the stern end of the supply ship. The crane has both a primary lifting system 11 and a secondary lifting system 12. The secondary lifting system is used for positioning the plates 4, the mat units 6 in desired position relative to the primary wires 5, while the primary lifting and lowering system 11 is designed to carry same from the vessel down towards the part of the mat 3 suspended towards the bottom, and otherwise being able to sustain other tensional loads which may arise. Each mat unit 6 is lifted clear of the deck 9 by means of the secondary lifting system 12 of the gantry crane 10 and is positioned correctly relative to the primary wires 5 and is attached to same. The primary wires are rolled up on a winch drum 13 arranged forwardly on the deck of the supply ship. The mat unit/mat is thereafter submerged into the water by feeding wire from the drums 13. When the top of the mat/mat unit has arrived into level with the stern end of the supply ship 7, the lowering operation is abrupted and the next mat unit 6 is lifted up by means of the secondary lifting system 12 and is correctly positioned on to the primary wire 5. Thereafter the mat unit 6 is being correctly mounted. The secondary lifting unit 12 is thereafter released, the mat/mat unit is lowered simultaneously as a new mat unit is lifted and brought into correct position relative to the primary wires. The mat units are in this way coupled together into a such long chain as is necessary. This coupling together is carried out subsequently and synchronous with the laying and lowering of the mat. Each mat unit 6 is preferably anchored to the primary wires 5 independent of the precedingly situated and mounted mat units 6. In accordance with the present invention the primary wires 5 are designed for carrying the full weight of both those in the sea and above the sea suspended mat sections/mat units. If mat units are utilized each mat unit is composed of a series of plates 4 in such a fashion that each plate 4 can carry its own weight, while special secondary wires 14 interconnect each plate in each mat unit 6 and carry the weight of all plates in each particular mat unit 6. FIG. 3 is showing an embodiment wherein the plates are firmly anchored to the primary wires 5 at the ends of the plates. FIGS. 5 and 6 are showing a similar embodiment. It shall herein however be pointed out that the plates 4 not necessarily must be anchored to the primary wires at the ends of the plates. It is namely fully possible to attach the primary wires to the plates 4 at a certain distance inside from the ends.

Figure 7:
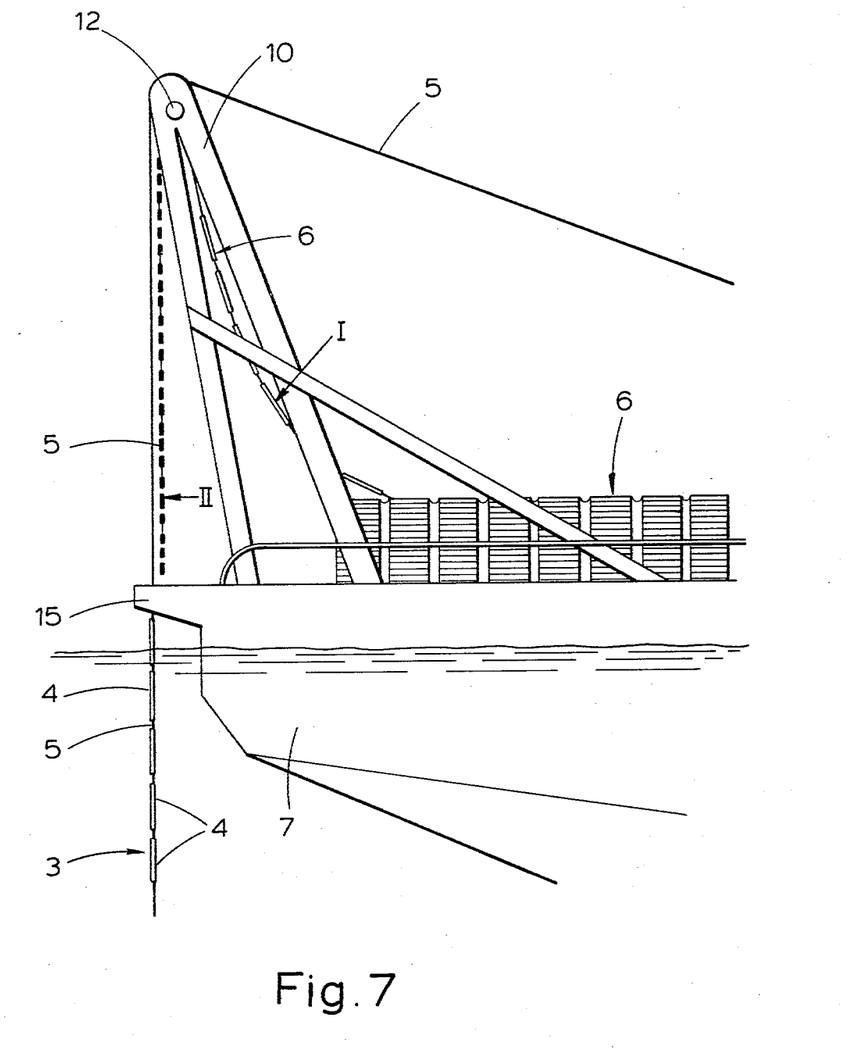
FIG. 7 is showing more in detail the stern of the supply ship shown in FIG. 5, and a proposed hoisting and setting means.

FIG. 7 is showing two various phases in the mounting process of mat units 6 to the primary wires 5. The two phases or steps are successively designated with the numbers I and II. The Figure is showing the stern end of a supply ship 7. On the ship is mounted a gantry crane which is equipped with a primary lifting system (not shown) and a secondary lifting system 12. The primary wires 5 extend from winches on the deck (not shown) above the gantry crane and down into the sea.

Readily mounted plates/mat units are suspended in the primary wires from deck level and down towards the sea-bed. Furthermore is a series of prefabricated mat units 6 stacked at the stern end of the supply ship. Phase I is showing a mat unit in the process of being lifted up by the secondary lifting system. Phase 2 is showing the step when the mat unit is in correct position relative to the primary wires and just before the attachment of the mat unit to same. The attachment operation is carried out from a working platform 15 which extends out from the stern end of the supply ship. When the lower end of the mat unit is attached to the primary wires, same is submerged down towards the sea-bed, simultaneously as the ship is moving. When the upper end of the mat unit is arrived into level with the working platform, the lowering is abrupted. The upper end of the mat unit is thereafter attached to the primary wires, simultaneously as a next mat unit is brought into correct position relative to the primary wires. It shall in this connection be pointed out that each mat unit for instance may be attached to the primary wires only at its upper and at its lower ends. It shall however, be pointed out that if desired, each mat unit can be attached to the primary wires on further attachment points.

Figures 4A, 4B:
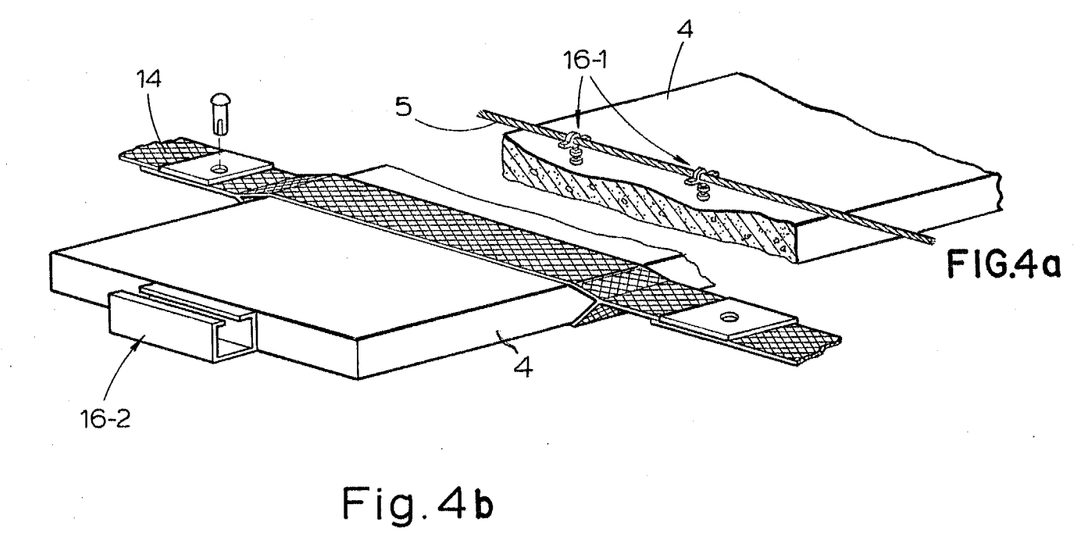
FIGS. 4a and 4b schematically show a section of a plate in a prefabricated mat unit. The Figures show two alternative solutions of the guiding and locking means for attaching the plates to the primary wires.

FIGS. 4a and b show two alternative fashions for attachment of the plates to the primary wires. In the first alternative each plate is, in desirable position, furnished with an embedded anchoring element for reception of attachment and locking means 16-1. In this alternative the attachment means are positioned at a certain distance inside the plate surface 4. In the second alternative on the contrary the guide and locking means 16-2 are positioned at the ends of the plates. The guide and locking means may be of any known type and constitute no actual part of the present invention. As shown in FIG. 4b, the plates are furthermore in one mat unit mutually interconnected by means of a secondary wire system 14. This consists of a nylon band or ribbon 14 which on each side of the plate is bolted in order to lock the plate against movements.

Figure 8:
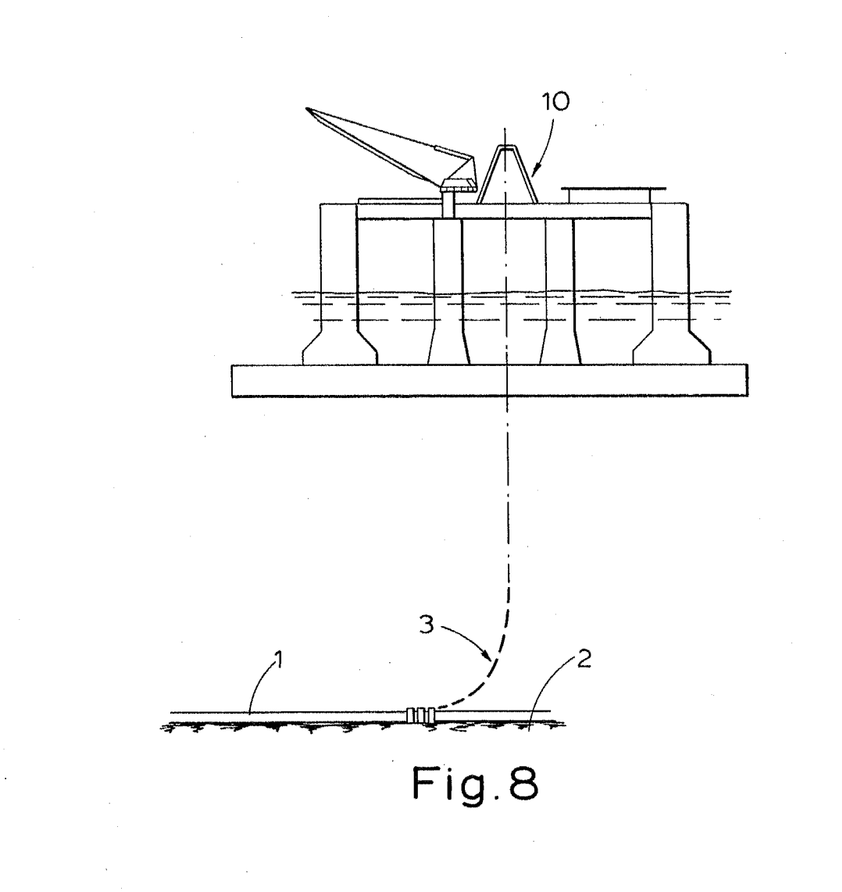
FIG. 8 is schematically showing a lateral view of a "semi-submersible" platform, utilized for the laying of the mats.
Figure 9:
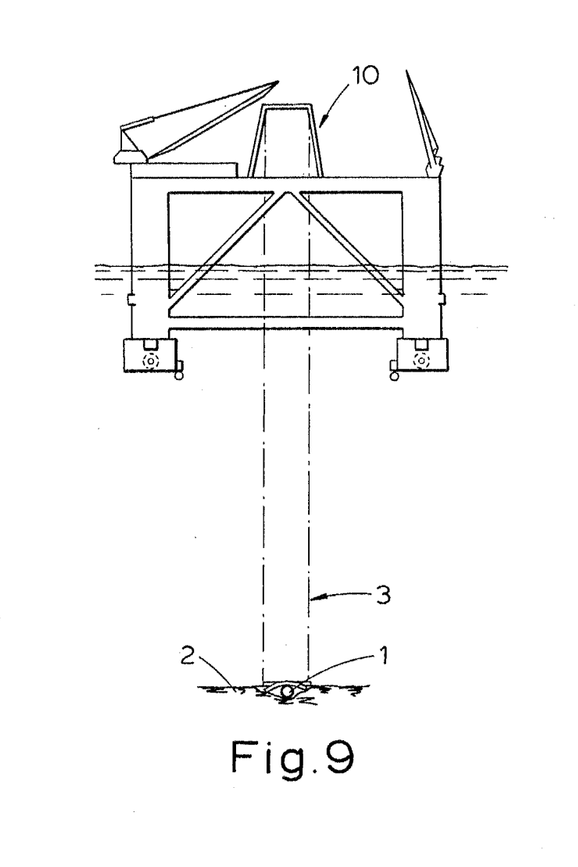
FIG. 9 is showing the platform shown in FIG. 8 viewed from astern.
Figure 10:
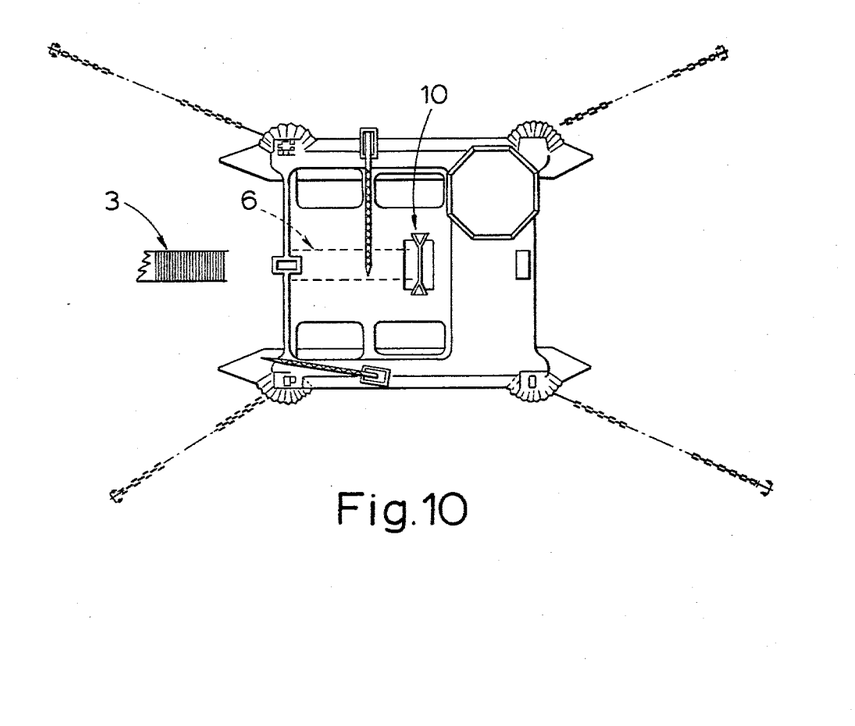
FIG. 10 is showing the platform in plane view.
Figure 11:
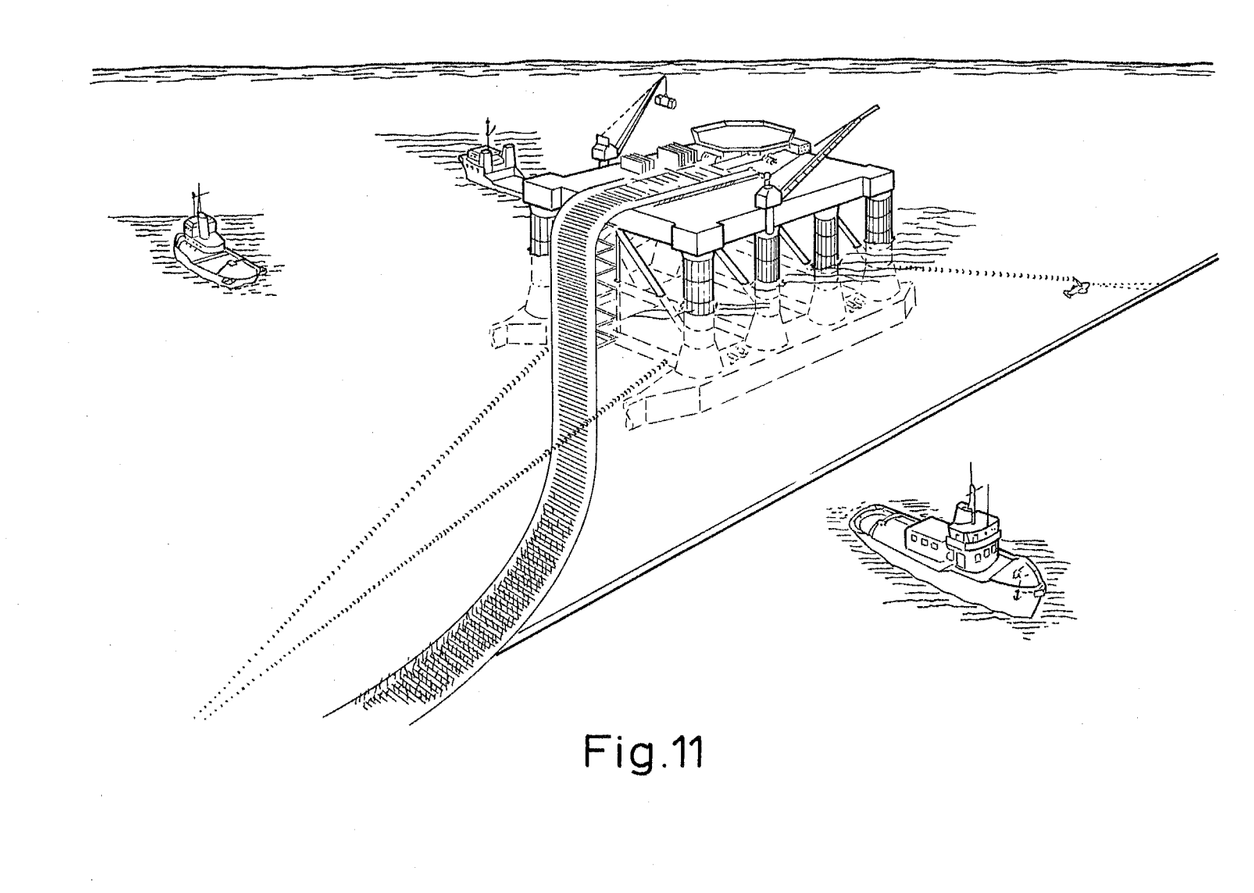
FIG. 11 is a perspective view of a "semi-submersible" carrying out the laying of a concrete mat combined with synthetic or artificial sea weed.
Figure 12:
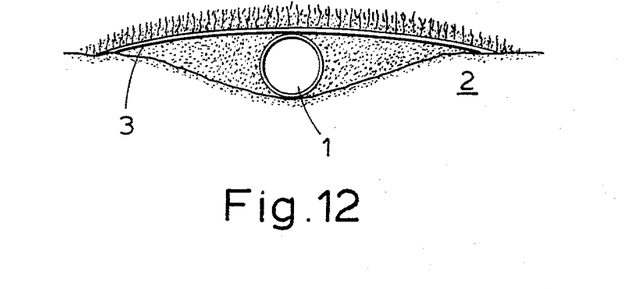
FIG. 12 is showing a cross sectional view through a pipe which is covered with a mat in accordance with one proposed embodiment of the present invention.

FIGS. 8, 9 and 10 are showing a semi-submersible vessel utilized for the setting operation. The same laying system as described in connection with a supply ship can with advantage also be utilized when laying from a semi-submersible vessel.

The only essential difference is that by laying from semi-submersible vessels the gantry crane should be placed at the centre of the working platform since the movements of the working platform will in connection with a semi-submersible vessel be smaller. On a semi-submersible vessel the laying equipment can be positioned on a feeding table and a rolling system can also be utilized.

We claim:

1. Means for protecting a selected area of a sea bottom surface by positioning a protective covering thereon from and by use of a surface laying vessel, comprising a supply of primary wire means on said vessel and initially extending with one of its ends down to the sea bottom and anchored thereto, a supply of concrete plate elements on said vessel, secondary means for flexibly connecting together a group of said plates one after the other and thereby forming a series of flexible elongated mat-like units each including a certain number of said plate elements, means for attaching said mat-like units one after the other to said primary wire means synchronously with the moving and feeding of said primary wire means from the supply, the thereby formed continuous mat-like protective body being adapted to be lowered to the sea bottom surface and positioned thereon while simultaneously moving the vessel at suitable speed.

2. Protective means as claimed in claim 1, wherein each concrete plate element with its longer axis extends transversely to the primary wire means and is of such small thickness that the plate element is flexible along its longer axis and will adapt itself, at least partly, to the pipe or other installation to be protected.

3. The protective means as claimed in claim 1, wherein a series of concrete plates are movably interconnected to form mat-like units and these units are attached between a pair of primary cables running substantially parallel to the pipeline or other sea bed installation to be protected.

4. The assembly as claimed in claim 3, wherein the concrete plates are generally rectangular in shape with the longer axis extending transversely to the said cables, the individual plates are slightly spaced from each other and are interconnected by intercoupling means permitting of relative motion between the plates.

5. The assembly as claimed in claim 1, wherein at least the top surface of the concrete plates has applied thereto a fibrous covering constituting artifical sea weed.

6. The assembly as claimed in claim 1, wherein said artifical sea weed material is positioned as marginal strips along the plates in each mat.

7. Means for protecting a selected area of a sea bottom surface by positioning a protective covering thereon from and by use of a surface laying vessel, comprising a supply of primary wire means on said vessel and initially extending with one of its ends down to the sea bottom and anchored thereto, a supply of concrete plate elements on said vessel, secondary means for flexibly connecting together a group of said plates one after the other and thereby forming a series of flexible elongated mat-like units each including a certain number of said plate elements, means for attaching said mat-like units one after the other to said primary wire means synchronously with the moving and feeding of said primary wire means from the supply the thereby formed continuous mat-like protective body being adapted to be lowered to the sea bottom surface and positioned thereon while simultaneously moving the vessel at suitable speed and wherein artifical sea weed in the form of longitudinally extending mat-like material is permanently attached to the concrete plate elements to form a secondary interconnection therebetween, thus bridging the spaces between adjoining plates.

8. The assembly as claimed in claim 7, wherein said artifical sea weed material is positioned as marginal strips along the plates in each mat.

9. The assembly as claimed in claim 2, wherein the plates in adapting themselves to the configuration of the pipeline and surrounding terrain will develop cracklines, but are held together by reinforcements in the concrete.

10. Method for providing a means for protection of a selected area of a sea bottom surface by positioning a protective covering thereon from and by use of a surface laying vessel, said method comprising, providing a supply of primary wire means on said vessel, initially extending an end of said primary wire means down to the sea bottom and anchoring same thereto, providing a supply of concrete plate elements on said vessel, connecting flexibly together a group of said plates one after the other by means of flexible secondary interconnecting means and thereby forming a flexible elongated mat-like unit including a certain number of said plate elements, attaching said mat-like units one after the other on to said primary wire means synchronously with the moving and feeding of said primary wire means from the supply and lowering the thereby formed continuous mat-like protective body down to the sea bottom surface and positioning same thereon while simultaneously moving the vessel at suitable speed.

* * * * *